United States Patent
Prince, Jr.

(10) Patent No.: US 6,233,662 B1
(45) Date of Patent: May 15, 2001

(54) METHOD AND APPARATUS FOR INTERLEAVING MEMORY ACROSS COMPUTER MEMORY BANKS

(75) Inventor: Harold Bailey Prince, Jr., Palo Alto, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/299,478

(22) Filed: Apr. 26, 1999

(51) Int. Cl.$^7$ .................................................. G06F 12/00
(52) U.S. Cl. ............................. 711/157; 711/5; 711/201; 711/202
(58) Field of Search ............................. 711/5, 157, 201, 711/202, 117

(56) References Cited

U.S. PATENT DOCUMENTS

| | | | |
|---|---|---|---|
| 5,293,607 | 3/1994 | Brockmann et al. | 711/5 |
| 5,652,861 | * 7/1997 | Mayo et al. | 711/157 |
| 5,809,555 | * 9/1998 | Hobson | 711/172 |
| 6,070,227 | * 5/2000 | Rokicki | 711/117 |

OTHER PUBLICATIONS

D.A. Patterson et al., "Computer Architecture A Quantitative Approach", 2nd Edition, p. 430–439.

* cited by examiner

Primary Examiner—Do Hyun Yoo
Assistant Examiner—Mehdi Namazi

(57) ABSTRACT

The present invention advantageously optimizes the flexibility built into some interleavers by novelly configuring an interleaver to improve the throughput of access to computer memory by maximizing the number of banks used for interleaving the memory. That is, the present embodiment improves the process of spreading memory references across multiple memory banks to increase throughput of the memory system by novelly configuring the control registers of an interleaver in a computer system. The present invention configures an interleaver so that it operates across "N" memory banks where "N" is not required to be a power of two. That is, the current embodiment of the present invention may approximate the number of memory banks available for interleaving to the a number that is equal to or closer to the number of memory banks available for interleaving, than previous solutions that were constrained to a power of two. Further, given such an interleaver, the present invention may use fewer than "N" entries and improves the approximation of the number of banks available for interleaving computer memory over prior art approximations. The present embodiment improves the efficiency of interleavers by configuring an interleaver by jointly configuring the entries in the configuration of the interleaver.

17 Claims, 4 Drawing Sheets

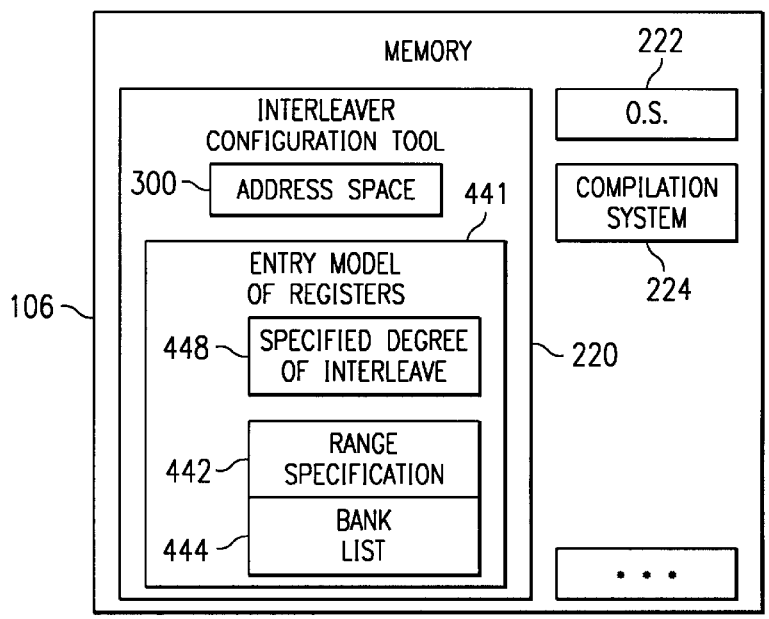
FIG. 2
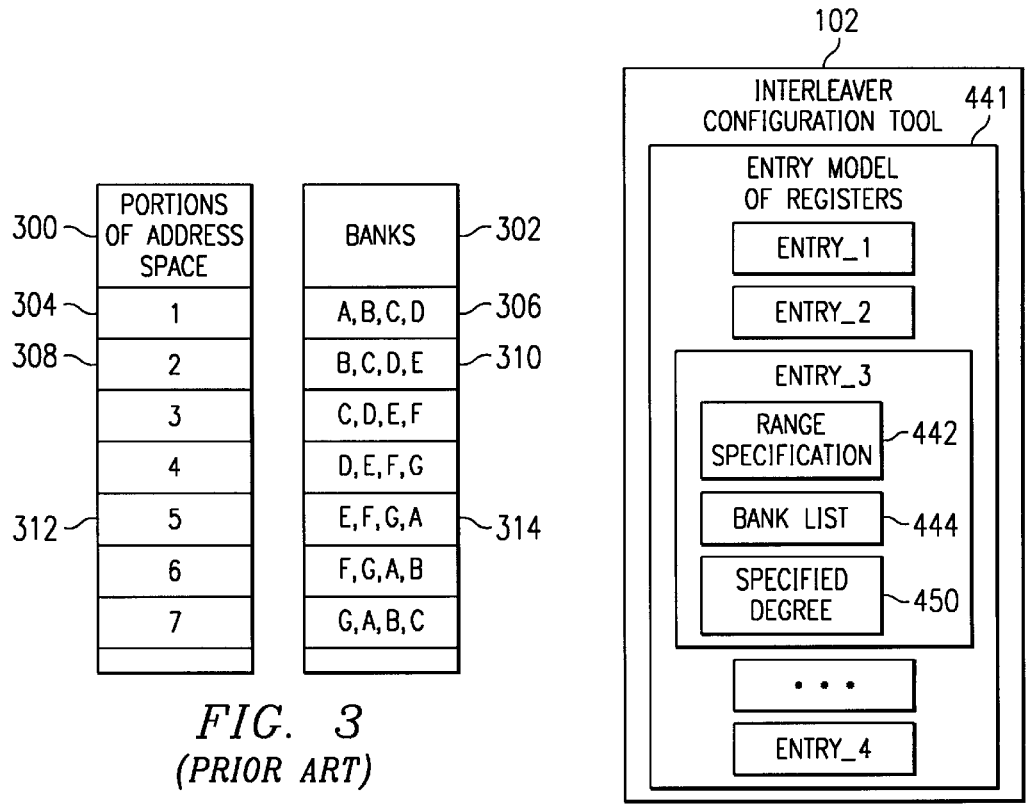
FIG. 3
(PRIOR ART)
FIG. 4A

METHOD AND APPARATUS FOR INTERLEAVING MEMORY ACROSS COMPUTER MEMORY BANKS

FIELD OF THE INVENTION

The present invention relates generally to a method and apparatus for interleaving memory in a computer system.

BACKGROUND OF THE INVENTION

Computer memory interleaving is the process of spreading memory references across multiple memory banks to increase throughput of the memory system. Interleaving may be accomplished by computer hardware called an interleaver that translates physical addresses such as those from the processor into a specific location in a memory bank.

Typically, memory access may be interleaved across a number of memory banks, where the number of memory banks may change. For example, since a memory bank is associated with computer hardware such as a memory board, the number of memory boards in a computer may be altered over the life of the computer. Therefore, variable requirements related to the number of memory banks may be accommodated by software or firmware configuration operations. That is, software may write configuration information to control registers of the interleaver that manage the manner of dividing the address space among the memory banks. This configuration information is used by the interleaver to translate physical addresses into memory bank labels and memory bank offsets. It will be appreciated by those skilled in the art that offsets may be used to locate specific addresses within a range of addresses.

Generally, when the number of memory banks is not a power of two, current interleavers operate by approximating the number of memory banks available for interleaving to the nearest power of two that is not greater than the actual number of available memory banks. Typically the full potential for improving throughput of memory access by interleaving is not realized by interleaving over a smaller, power of two, number of memory banks.

Some interleavers are flexible and may allow variation in the degree of interleave, the size of the range of addresses, or the values that may be loaded in a bank list. However, configuration operations of current interleavers do not take advantage of some of the flexible features of this type of interleaver.

Further during the configuration process, some current interleavers operate by requiring as many configuration entries as there are available memory banks. Since the resources available to the interleaver for configuration is fixed and small, reduction of the number of configuration entries would improve the efficiency of interleaving.

SUMMARY OF THE INVENTION

The present invention advantageously optimizes the flexibility built into some interleavers by novelly configuring an interleaver to improve the throughput of access to computer memory by maximizing the number of banks used for interleaving the memory. The present invention configures an interleaver so that it operates across "N" memory banks where "N" is not required to be a power of two. Given an N-way interleaver, the present invention may use fewer than N entries and improves the approximation of the number of banks used for interleaving computer memory over prior art approximations.

The present embodiment of the invention is an interleaver configuration tool that may vary the configuration information of an interleaver related to the degree of interleave, the size of the range of addresses, or the values that may be loaded in a bank list to improve throughput of access to memory banks. While the present embodiment describes an interleaver configuration tool that operates in cooperation with an interleaver that may be configured by software or firmware, it will be appreciated that the present invention is not limited to interleavers of this specific type.

It is therefore an object of the invention to improve the process of spreading memory references across multiple memory banks to increase throughput of the memory system by novelly configuring the control registers of an interleaver in a computer system.

It is also an object of the invention to improve the throughput of memory access by interleaving over a number of available memory banks, where the number is not constrained to a power of two. That is, the current embodiment of the present invention may approximate the number of memory banks used for interleaving to the a number that is equal to or closer to the number of memory banks used for interleaving, than previous solutions that were constrained to a power of two.

It is yet another object of the invention to limit the number of entries required for configuration of an interleaver to less than the number of available memory banks thereby reducing the number of resources required to configure an interleaver.

It is yet another object of the invention to improve the efficiency of interleavers by configuring an interleaver by jointly configuring the entries in the configuration of the interleaver.

BRIEF DESCRIPTION OF THE DRAWINGS

FIG. 2 is a block diagram of the memory that includes the interleaver configuration tool and the data structures it uses;

FIG. 3 is a high level block diagram that illustrates the operation of a typical interleaver;

FIG. 4A is a block diagram that illustrates the interleaver configuration tool;

DETAILED DESCRIPTION

Figure 1:
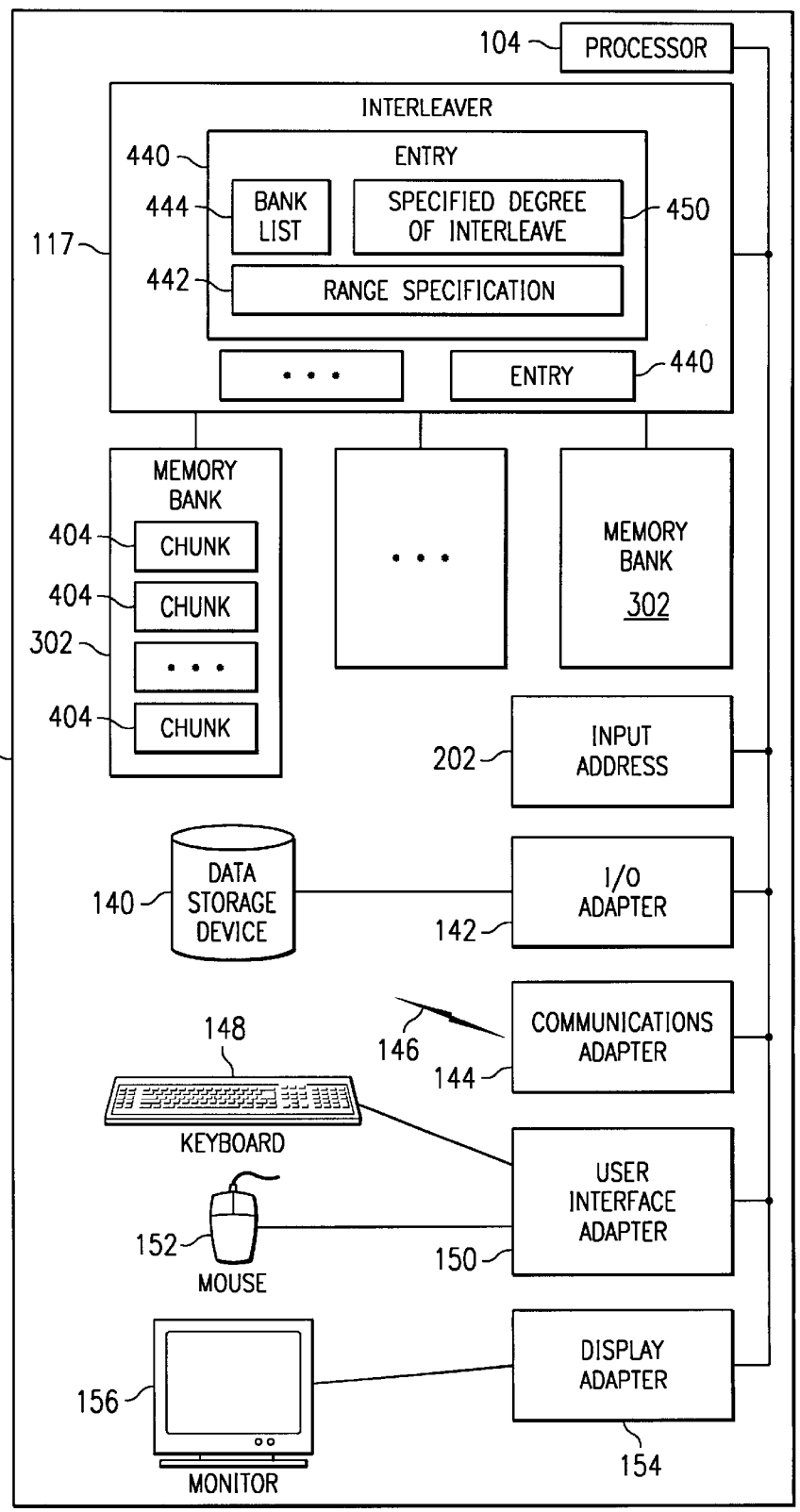
FIG. 1 is a block diagram that illustrates a computer system in which the interleaver configuration tool operates.

In the following detailed description and in the several figures of the drawings, like elements are identified with like reference numerals.

Broadly stated, FIG. 1 illustrates a computer system 100 in which the interleaver configuration tool 220 (as shown in FIG. 2) operates. The interleaver configuration tool 220 configures the interleaver 117 so that it operates across "N" memory banks 302 where "N" is not required to be a power of two. That is, the interleaver configuration tool 220 creates a configuration that the interleaver 117 uses to map a range of the physical address space of the computer system 100 to memory banks 302 and offsets. Further, the computer system 100 may contain an input address 202 that may be used by the interleaver to identify the location of the memory bank 302.

Computer memory banks 302 may be any of a variety of known memory storage devices or future memory devices, including any commonly available random access memory (RAM), memory boards, cache memory, magnetic medium such as a resident hard disk, or other memory storage devices. In one embodiment the operating system (O.S.) 222 and the interleaver configuration tool 220 (as are shown in FIG. 2) may reside in the memory banks 302 during execution in the computer system 100.

In order to handle a variable number of memory banks 302, the interleaver 117 is sometimes configurable by software or firmware, such as the interleaver configuration tool 220. To configure the interleaver 117, the interleaver configuration tool 220 writes values into control registers, or entries 440, of the interleaver 117. These values identify to the interleaver 117 the memory banks 302 that are participating in the interleave, and how address space should be divided among the banks 302. This information is used by the interleaver 117 to translate physical addresses into memory banks 302 and offsets. It will be appreciated that the information may be actual memory bank 302 addresses or labels that represent the location of a memory bank 302.

It will be appreciated that a memory bank 302 is a physical unit of the memory 106 (as shown in FIG. 2) and may be independently accessed. Further, interleaving the address space across multiple banks 302 of the memory 106 refers to the operation of addressing different banks 302 of the memory 106 in an order that may stagger requests to access the memory 106. Thereby, the load on a computer system 100 related to access of the memory 106 may be dispersed across multiple memory banks 302. It will be understood that the term "bank" and "memory bank" will be used interchangeably herein and that the memory 106 is a representation of the memory banks 302. In some computer systems 100, the time required to access a memory bank 302 may vary from bank to bank, and interleaving access to the memory 106 may allow staggering of access requests such that the memory access time may appear more uniform.

It will be appreciated by those skilled in the art, that the number of banks 302 available for interleaving may not be known when the interleaver is designed. For instance, a computer system 100 may have some empty memory board slots or may contain memory boards that are not used by the interleaver 117.

A chunk 404 is an abstraction that is the smallest unit of the memory 106 and represents in-order addresses in the physical address space 300 allocated to a memory bank 302. Chunks 404 are the same size in a computer system 100 and the size is usually not configurable. Chunks 404 may be used to describe both a portion of the memory bank 302 and the physical addresses mapped to the memory bank 302. Further, chunks 404 may be related to the input address 202 when the chunk 404 represents the unit of the memory 106 that is made available for allocation to a specific bank. Chunks 404 may also be related to banks 302 when the chunk 404 is allocated to a bank 302. The present embodiment creates a configuration for the interleaver 117 and thereby establishes a mapping between physical addresses 300 and the chunks 404. It will be understood that chunks 404 may be represented by labels, values, or numbers that identify a particular chunk 404.

Typically, interleavers 117 use a portion of the input address 202 (as shown in FIG. 2) that identifies the bank 302 of the memory 106 that will be accessed by the interleaver 117. The use of a portion of the input address 202 often restricts the number of banks 302 to a power of two, since a portion of the input address 202 may be represented by a number of bits, here "n," and may take on $2^n$ values. Typically when the number of banks 302 is a power of two, computer systems 100 may shift bits to improve the efficiency of the operation used to determine the appropriate bank 302 that will be accessed. Therefore, some interleavers 117 restrict the interleave operation to a number of banks 302 that is a power of two to optimize the process of determining the appropriate bank 302. Those skilled in the art will appreciate that a bit is the smallest unit of measurement in a computer system 100 and generally may either have the value of "on" or "off."

An interleaver 117 may be used with a number of banks 302 that is not a power of two but typically requires rounding down the number of banks 302 used at one time for interleaving to a power of two. Therefore, if "N" is the number of banks, and "P" represents "N" rounded down to a power of two, then the memory address space may be split into "N" equal portions that are interleaved over "P" banks. Those skilled in the art will appreciate this technique.

An interleaver 117 may operate with configuration registers that may be referred to by at least one entry 440 that contains the configuration that will be transferred from the interleaver configuration tool 220 to the interleaver 117. The entry 440 includes a range specification 442 that represents the range of addresses the interleaver 117 may access. The entry 440 also includes a bank list 444 that is a list of the banks 302 that may be accessed in the range specified by the range specification 442.

The entry 440 also includes a specified degree of interleave 450 that is the value of the degree of interleave for a particular entry 440, such as the number of banks to be interleaved in a particular entry 440. The specified degree of interleave 450 will be discussed with reference to FIG. 4B. It will be appreciated that the interleaver configuration tool 220 may also access information about the number of banks 302 over which the memory 106 is interleaved. FIG. 1 further represents the computer system 100 that includes components such as the processor 104, the memory banks 302, the interleaver 117, a data storage device 140, an I/O adapter 142, a communications adapter 144, the communications network 146, a user interface adapter 150, a keyboard 148, a mouse 152, a display adapter 154, and a computer monitor 156. It will be understood by those skilled in the relevant art that there are many possible configurations of the components of the computer system 100 and that some components that may typically be included in the computer system 100 are not shown.

The data storage device 140 may be any of a variety of known or future devices, including a compact disk drive, a tape drive, a removable hard disk drive, or a diskette drive. Any such program storage device may communicate with the I/O adapter 142, that in turn communicates with other components in the computer system 100, to retrieve and store data used by the computer system 100. As will be appreciated, such program storage devices typically include a computer usable storage medium having stored therein a computer software program and data.

Input devices could include any of a variety of known I/O devices for accepting information from a user, whether a human or a machine, whether local or remote. Such devices include, for example the keyboard 148, the mouse 152, a touch-screen display, a touch pad, a microphone with a voice recognition device, a network card, or a modem. The input devices may communicate with a user interface I/O adapter 142 that in turn communicates with components in the computer system 100 to process I/O commands. Output devices could include any of a variety of known I/O devices for presenting information to a user, whether a human or a machine, whether local or remote. Such devices include, for example, the computer monitor 156, a printer, an audio speaker with a voice synthesis device, a network card, or a modem. Output devices such as the monitor 156 may communicate with the components in the computer system 100 through the display adapter 154. Input/output devices could also include any of a variety of known data storage devices 140 including a compact disk drive, a tape drive, a removable hard disk drive, or a diskette drive.

By way of illustration, the executable code 124 may typically be loaded through an input device and may be stored on the data storage device 140. A copy of the executable code 124 or portions of it, may alternatively be placed by the processor 104 into the memory 106 for execution on the computer system 100.

The computer system 100 may communicate with the network 146 through a communications adapter 144, such as a networking card. The network 146 may be a local area network, a wide area network, or another known computer network or future computer network. It will be appreciated that the I/O device used by the interleaver configuration tool 220 may be connected to the network 146 through the communications adapter 146 and therefore may not be co-located with the computer system 100. It will be further appreciated that other portions of the computer system 100, such as the data storage device 140 and the monitor 156, may be connected to the network 146 through the communications adapter 144 and may not be co-located.

FIG. 2 illustrates data structures and functions used by the interleaver configuration tool 220 and that may be stored in the memory 106. The data structures and functions are listed in the general order of discussion with reference to the figures.

The memory 106 may include the following:
an O.S. 222 that cooperates with the processor 104 to execute programs;
a compilation system 224 that prepares code for program execution;
an interleaver configuration tool 220 that configures entries 440 in an interleaver 117 (as shown in FIG. 1), and that includes the address space 300, the entry model of the registers 441, the range specification 442, the bank list 444, and the specified degree of interleave 450;
the address space 300 of the memory 106 that may be associated with a set of identified banks 302;
the entry model of the registers 441 that is associated with the interleaver 117 (as shown in FIG. 1) and that is included in the interleaver configuration tool 220;
the range specification 442 that is included in the entry model 441 and that represents the range of addresses controlled by the associated entry model 441;
the bank list 444 that is a list of the banks 302 that may be accessed in the range specification 442 and is included in the entry model 441;
the specified degree 450 that is the value of the degree of interleave for a particular entry model 441, and it will be understood that the terms "specified degree of interleave" and "specified degree" will be used interchangeably herein;
as well as other data structures and functions.

It will be understood by those skilled in the art that the functions ascribed to the interleaver configuration tool 220, or any of its functional files, typically are performed by the central processing unit that is embodied as the processor 104 (as shown in FIG. 1) executing such software instructions. The processor 104 typically operates in cooperation with other software programs such as the compilation system 224, the O.S. 222, and the interleaver configuration tool 220. Henceforth, the fact of such cooperation among the processor 104 and the interleaver configuration tool 220, whether implemented in software, hardware, firmware, or any combination thereof, may therefore not be repeated or further described, but will be implied.

The interleaver configuration tool 220 may operate under the control of the O.S. 222. Alternately, the finctions of the interleaver configuration tool 220 may be performed by hardware operations that cooperate with the processor 104 and other features of the computer system 100 (as shown in FIG. 1) and may not operate in software or under the control of the O.S. 222.

It will also be understood by those skilled in the relevant art that the functions ascribed to the interleaver configuration tool 220 and its functional files, whether implemented in software, hardware, firmware, or any combination thereof, may in some embodiments be included in the functions of the O.S. 222. That is, the O.S. 222 may include files from the interleaver configuration tool 220. In such embodiments, the functions ascribed to the interleaver configuration tool 220 typically are performed by the processor 104 executing such software instructions in cooperation with aspects of the O.S. 222 that incorporate the interleaver configuration tool 220. Therefore, in such embodiments, cooperation by the interleaver configuration tool 220 with aspects of the O.S. 222 will not be stated, but will be understood to be implied.

The compilation system 224 and the O.S. 222, may also reside in the memory 106 when the interleaver configuration tool 220 is operating. Further, the compilation system 224 may operate in cooperation with the O.S. 222 to arrange the execution of the interleaver configuration tool 220. The present embodiment may employ the compilation system 224 to resolve any undefined computer location references, and to generate code for the interleaver configuration tool 220 capable of executing on the computer system 100 with input/output (I/O) devices such as a keyboard 148 and a mouse 152.

It will be appreciated that "execute" refers to the process of manipulating software or firmware instructions for operation on the computer system 100. The term "code" refers to instructions or data used by the computer system 100 for the purpose of generating instructions or data that execute in the computer system 100. Also, the term "function" may refer to a software "procedure" such as a unit of software that may be independently compiled. A "process" is an operation that executes on a computer and interacts with other computer-based executing units such as a function or a procedure.

The interleaver configuration tool 220 may be implemented in the "C" programming code language, although it will be understood by those skilled in the relevant art that other programming code languages could be used. Also, the interleaver configuration tool 220 may be implemented in any combination of software code, hardware, or firmware code.

The interleaver configuration tool 220 includes instructions and data that may be referred to as values such as integer, real, or complex numbers; or characters. Alternately, the values may be pointers that reference values. Therefore, a pointer provides direction to locate a referenced value.

More particularly, the instructions may be operating instructions of the computer system 100, and may reference addresses. The addresses may be physical computer addresses or addresses that map to physical computer addresses. For instance, a physical computer address may be a computer hardware register (not shown) or a location in the memory 106.

FIG. 3 is a block diagram that illustrates the configuration of a typical interleaver 117 (as shown in FIG. 1) of the prior art. In the present example, "N=7" since there are seven banks 302, and the address space is split into seven portions. Here "P=4" since seven rounded down to the nearest power of two is four. Therefore as shown in element 300, since the addressing scheme for the memory banks 302 is typically designed to operate over a "power of two" number of banks 302, the portions of the address space 300 are associated with a set of four identified banks, as shown in element 302.

More particularly as shown in element 304, and by way of example, the first portion of the address space 300 is mapped to four banks 302, labeled "A," "B," "C," and "D" as shown in element 306. The next portion of the address space 300 as shown in element 308 is mapped to four banks 302, "B," "C," "D," and "E, as shown in element 310.

It will be appreciated that when the portion of the address space 300, as shown in element 312, is mapped to a different set of four banks 302 that exceed the number of available ordered banks 302 the first bank 302 is re-used. For instance, as shown in element 314, banks "E," "F," "G," and "A" are mapped from the fifth portion of the address space 300 as shown in element 312. This technique is further described with respect to U.S. Pat. No. 5,293,607.

Table 1 below illustrates a prior art configuration of the interleaver 117, such as is illustrated in FIG. 3. More particularly Table 1 illustrates seven-way interleave. That is, the illustration of Table 1 includes seven banks 302, "A" through "G," and each bank 302 includes sixteen bytes of physical memory 106, and each range specification 442 (as shown in FIG. 1) is also sixteen bytes in size. Further, the chunk 404 (as shown in FIG. 1) size is one byte. Therefore, the size of the address space 300 (as shown in FIG. 2) is 112 bytes since 7*16=112. There are eight items in the bank list 444 (as shown in FIG. 1). It will be appreciated that a typical interleaver may operate with more elements in the bank list 444, with larger chunks 404, with more chunks 404, and with a larger address space 300 than the representation of the present example, but the small representation is used here to simplify the illustration.

The seven-way interleave solution in prior art interleaves over four banks 302 at a time. For example, entry one is interleaved over banks 302 labeled, "A," "B," "C," and "D," and entry two is interleaved over banks 302 labeled, "B," "C," "D," and "E," and so on.

TABLE 1

Seven-way Interleave:

| Entry | Range Specification | Degree | Banks |
|---|---|---|---|
| 1 | 0–15 | 1 | A B C D A B C D |
| 2 | 16–31 | 1 | B C D E B C D E |

TABLE 1-continued

Seven-way Interleave:

| Entry | Range Specification | Degree | Banks |
|---|---|---|---|
| 3 | 32–47 | 1 | C D E F C D E F |
| 4 | 48–63 | 1 | D E F G D E F G |
| 5 | 64–79 | 1 | E F G A E F G A |
| 6 | 80–95 | 1 | F G A B F G A B |
| 7 | 96–112 | 1 | G A B C G A B C |

The range specification 442 (as shown in FIG. 2) is mapped by starting at the beginning of each bank 302. It will be understood that the interleaver configuration tool 220 may also operate on interleavers 1117 that map the range specification 442 and the addresses of the bank 302 in another fashion and is not limited to the present embodiment. That is, interleavers 1 17 may include additional functions to control further mapping as is necessary to address the physical locations in the bank 302 of the memory 106 when the physical locations do not start at the beginning of a bank 302.

Table 2 below illustrates an example of the results of the configuration of some prior art interleavers 117 as shown in Table 1 above. More particularly Table 2 illustrates seven-way interleave. The elements in the table are physical addresses. By referring to Table 1 the physical address space 300 associated with each entry model 441 may be determined. For instance the second entry model 441 controls addresses 16–31. Therefore, as shown in Table 2 below, addresses 16–31 are allocated to the banks 302 labeled "B," "C," "D," and "E."

TABLE 2

Results of Seven-way Interleaving:

| Chunk Number in the Bank | Bank | | | | | | |
|---|---|---|---|---|---|---|---|
| | A | B | C | D | E | F | G |
| 0 | 0 | 16 | 32 | 48 | 64 | 80 | 96 |
| 1 | 97 | 1 | 17 | 33 | 49 | 65 | 81 |
| 2 | 82 | 98 | 2 | 18 | 34 | 50 | 66 |
| 3 | 67 | 83 | 99 | 3 | 19 | 35 | 51 |
| 4 | 4 | 20 | 36 | 52 | 68 | 84 | 100 |
| 5 | 101 | 5 | 21 | 37 | 53 | 69 | 85 |
| 6 | 86 | 102 | 6 | 22 | 38 | 54 | 70 |
| 7 | 71 | 87 | 103 | 7 | 23 | 39 | 55 |
| 8 | 8 | 24 | 40 | 56 | 72 | 88 | 104 |
| 9 | 105 | 9 | 25 | 41 | 57 | 73 | 89 |
| 10 | 90 | 106 | 10 | 26 | 42 | 58 | 74 |
| 11 | 75 | 91 | 107 | 11 | 27 | 43 | 59 |
| 12 | 12 | 28 | 44 | 60 | 76 | 92 | 108 |
| 13 | 109 | 13 | 29 | 45 | 61 | 77 | 93 |
| 14 | 94 | 110 | 14 | 30 | 46 | 62 | 78 |
| 15 | 79 | 95 | 111 | 15 | 31 | 47 | 63 |

FIG. 4A is a block diagram at illustrates the entry models 441 used by the interleaver configuration tool 220 and that are copied to the entries 440 in the interleaver 117 (as are shown in FIG. 1). Each entry 440 in the interleaver 117 controls a different range of the physical address space of the memory 106 (as shown in FIG. 2) in the computer system 100 (as shown in FIG. 1). Each entry model 441 includes a range specification 442, a bank list 444, and a specified degree of interleave 450. The range specification 442 represents the range of addresses that the interleaver configuration tool 220 may configure for the interleaver 117. The range specification 442 is different for each entry model 441 because different address ranges are represented by each entry model 441. More particularly, the range specification 442 may include a starting address, the length of the range, an ending address, or other information that may be used to determine the range of addresses.

In the present embodiment, the bank list 444 is a list of the banks 302 that may be accessed. The size of the bank list 444 is a fixed number that is defined for a particular computer system 100.

In the present embodiment, the number of banks 302 which are interleaved over the memory 106 is determined by the configuration of the computer system 100. The number of banks 302 may be available to the interleaver 117 and to the interleaver configuration tool 220. The specified degree of interleave 450 is the value of the degree of interleave for a particular entry model 441 and will be described in detail with respect to FIG. 4B.

Figure 4B:
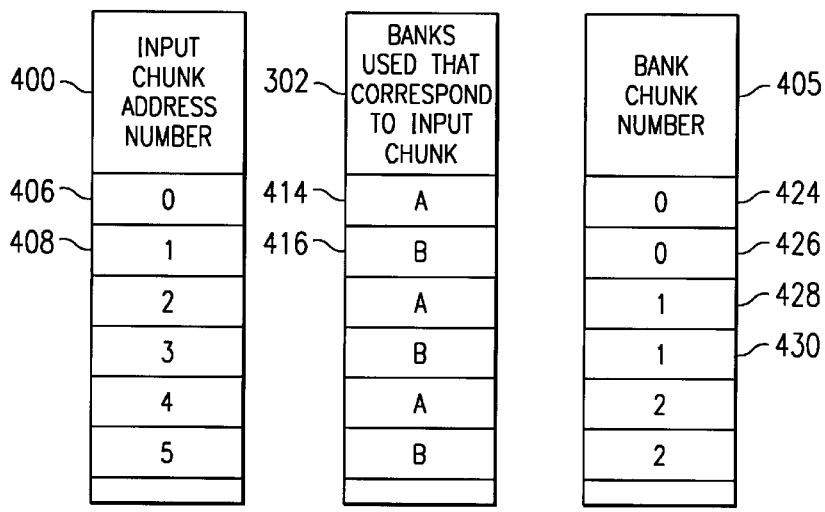
FIG. 4B is a block diagram that illustrates the operation of a type of interleaver.

FIG. 4B is a block diagram that illustrates the operations of the interleaver 117 (as shown in FIG. 1). An interleaver 117 may allocate the first chunk 404 to the first bank 302 and the next chunk to the next bank 302 in an identified order. By means of example, if there are 16 elements in the bank list 444 (as shown in FIG. 2) then the first chunk 404 may be allocated to the bank 302 labeled "A," the second chunk 404 to the bank 302 labeled "B," and the seventeenth chunk 404 will be allocated to the bank 302 labeled "A" which is the start of another cycle of allocation of the banks 302.

In the present example, after the interleaver 117 has been configured and when the interleaver 117 takes an address as input, such as the input address 202 (as shown in FIG. 1), the interleaver 117 identifies the appropriate element in the bank list 444 that is associated with the identified address. This identification is accomplished by determining the chunk 404 number as shown in element 400, which may be derived from the input address 202. After the input chunk 404 number is identified, the bank 302 may be determined from the input chunk 404 number. After the bank 302 is determined the appropriate bank chunk 404 within the bank 302 is determined as shown in element 405.

More particularly the present example as shown in FIG. 4B interleaves over two banks 302, and the input chunk number of "0" as represented by element 406 is associated with the bank 302 labeled "A" as shown in element 414, and the bank chunk 404 number is "0." Similarly, the input chunk 404 number of "1" as represented by element 408 is associated with the bank 302 labeled "B" as shown in element 416. As shown in element 426, the chunk 404 is also "0." It will be noted that the chunks 404 increment by two since there are two banks 302 in this example.

That is, since the interleaving is over two banks 302, each of the two banks 302 has a chunk 404 with the value of "0," a chunk 404 with the value of "1," and so on.

By way of explanation, the interleaver 117 determines the bank chunk number 404 by use of the specified degree of interleave 450 (as shown in FIG. 2) and not by the elements in the bank list 444. For example in FIG. 4B, the chunk 404 having the value "0" appears twice, once as shown in element 424 and once as shown in element 426. The chunk 404 with value "1" then appears twice, once as shown in element 428 and once as shown in element 430. Therefore, the chunk 404 with value "0" and the chunk 404 with value "1" both appeared twice before moving to the next value of a chunk 404 and the specified degree of interleave 450 is two in the example illustrated in FIG. 4B.

Configuration Produced by First Embodiment

Figure 5A:
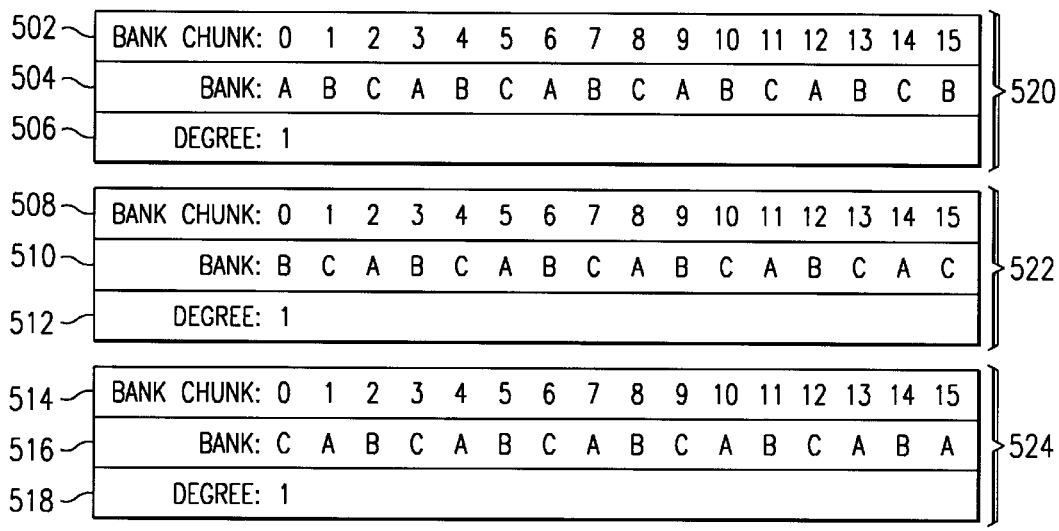
FIG. 5A is a block diagram that illustrates a configuration resulting from the operation of the first embodiment of the interleaver configuration tool.

FIG. 5A is a block diagram that illustrates the configuration created by one embodiment of the interleaver configuration tool 220 (as shown in FIG. 2) and that is used by the interleaver 117. In the present embodiment the interleaver configuration tool 220 novelly creates the configuration with minimal to no need to round the number of banks 302 down to a power of two, given the number of banks over which the memory 106 (as shown in FIG. 2) is interleaved and the number of chunks 404 (as are shown in FIG. 1) per bank. In the example of the first embodiment the number of banks, "N," equals three, there are sixteen elements in the bank list 444, and the range specifications 442 (as are shown in FIG. 2) are the same size. Three entry models 441 (as shown in FIG. 2) are defined as shown in elements 520, 522, and 524 and are managed together by the interleaver configuration tool 220 to create the configuration. By operating with three entry models 441 the interleaver configuration tool 220 novelly creates a configuration for interleaving the memory 106 over the three banks 302 (as shown in FIG. 1). Each entry model 441 has a specified degree 450 (as shown in FIG. 2) of one. Recall that the interleaver configuration tool 220 can configure bank lists 444, range specifications 442, and the specified degree of interleave 450.

More particularly and by way of example, given a specified degree of interleave 450 that is one, the bank chunks 404 as shown in element 502 are ordered consecutively from the chunk 404 with value "0" to the chunk 404 with value "15." The banks 302 are assigned starting with the bank 302 having the label "A," then the bank 302 with the label "B," and finally the bank 302 with the label "C," as shown in element 504. Similarly, the bank chunks 404 as shown in element 508 are consecutively ordered from the chunk 404 with value "0" to the chunk 404 with value "15." The banks 302 are assigned starting with the bank 302 having the label "B," then the bank 302 with the label "C," and finally the bank 302 with the label "A," as shown in element 510. Finally, the bank chunks 404 as shown in element 514 are consecutively ordered from the chunk 404 with value "0" to the chunk 404 with value "15." The banks 302 are assigned starting with the bank 302 having the label "C," then the bank 302 with the label "A," and finally the bank 302 with the label "B," as shown in element 516. Further, the specified degree 450 for each entry model 441 is one, as shown in elements 506, 512, and 518.

The interleaver configuration tool 220 creates a configuration for the interleaver 117 over the three entry models 441, and in the present embodiment the number of banks 302 over which the memory 106 is interleaved is three and the specified degree 450 is one. Since the number of elements in the bank list 444 is sixteen and the number of banks 302 is three, the last chunk 404 of each entry model 441 must be managed as a special case.

Recall that the interleaver 117 may re-use the banks 302 for each entry 440 (as shown in FIG. 1) but not the bank chunks 404. The next available value of the chunk 404 after the value of "15" is "16," which will be mapped to the bank with the same (label as the chunk 404 with the value of "0" is mapped. Since the chunk 404 with the value of "0" is mapped to the bank 302 with the label of "A," the chunk with the value of "16" will be mapped to the bank 302 with the label of "A." Therefore, the present embodiment may map the chunk 404 with the value of "15" to a bank 302 having a label other than "A." As shown in element 502, the chunk 404 with the value "15" is mapped to the bank 302 with the label "B" as shown in element 504. That is, the seventeenth allocation of the chunk 404 will be with the value of "16" to the bank 302 with the label "A," which limits the possibility of allocating the chunk 404 with the value of "15" to the bank 302 with the label of "A."

The present embodiment novelly configures interleaving of banks 302 over three entry models 441, as shown in elements 520, 522, and 524. Therefore, it will be noted that any bank chunk 404 value is only mapped to a specific bank 302 label once over the three entry models 441. For example, the bank chunk 404 with the value of "0" is mapped to the bank with the label "A" in elements 502 and 504. The bank chunk 404 with the value of "0" is mapped to the bank with the label "B" in elements 508 and 510. Finally, the bank chunk 404 with the value of "0" is mapped to the bank 302 with the label "C" in elements 514 and 516. Therefore, the bank chunk 404 with the value of "0" is properly used three times over the three entry models 441 and mapped to each label used for a bank 302 only once.

Table 3 illustrates the configuration produced by the first embodiment of the interleaver configuration tool 220 for seven-way interleave. That is, the illustration of Table 3 includes seven banks 302, "A" through "G," and each bank 302 includes sixteen bytes of physical memory 106, and each range specification 442 (as shown in FIG. 1) is also sixteen bytes in size. Further, the chunk 404 (as shown in FIG. 1) size is one byte. Therefore, the size of the address space 300 (as shown in FIG. 2) is 112 bytes since 7*16=112. There are eight items in the bank list 444 (as shown in FIG. 1).

TABLE 3

Configuration Produced by the First Embodiment

| Entry | Range Specification | Degree | Banks |
|---|---|---|---|
| 1 | 0–15 | 1 | A B C D E F G D |
| 2 | 16–31 | 1 | B C D E F G A E |
| 3 | 32–47 | 1 | C D E F G A B F |
| 4 | 48–63 | 1 | D E F G A B C G |
| 5 | 64–79 | 1 | E F G A B C D A |
| 6 | 80–95 | 1 | F G A B C D E B |
| 7 | 96–112 | 1 | G A B C D E F C |

Table 4 below illustrates the results of the configuration of the first embodiment as shown in Table 3 above. The elements in the table are physical addresses. By referring to Table 3 above the physical address space 300 associated with each entry model 441 may be determined. For instance the second entry model 441 controls addresses 16–31. Therefore, as shown in Table 4 below, addresses 16–31 are allocated in the same order as shown in Table 3. That is address 16 is allocated to the bank 302 labeled "B," address 17 is allocated to bank 302 labeled "C," and so on.

TABLE 4

Results of Configuration Produced by the First Embodiment:

| Chunk Number in the Bank | Bank | | | | | | |
|---|---|---|---|---|---|---|---|
| | A | B | C | D | E | F | 0 |
| 0 | 0 | 16 | 32 | 48 | 64 | 80 | 96 |
| 1 | 97 | 1 | 17 | 33 | 49 | 65 | 81 |
| 2 | 82 | 98 | 2 | 18 | 34 | 50 | 66 |
| 3 | 67 | 83 | 99 | 3 | 19 | 35 | 51 |
| 4 | 52 | 68 | 84 | 100 | 4 | 20 | 36 |
| 5 | 37 | 53 | 69 | 85 | 101 | 5 | 21 |
| 6 | 22 | 38 | 54 | 70 | 86 | 102 | 6 |
| 7 | 71 | 87 | 103 | 7 | 23 | 39 | 55 |
| 8 | 8 | 24 | 40 | 56 | 72 | 88 | 104 |
| 9 | 105 | 9 | 25 | 41 | 57 | 73 | 89 |
| 10 | 90 | 106 | 10 | 26 | 42 | 58 | 74 |

TABLE 4-continued

Results of Configuration Produced by the First Embodiment:

| Chunk Number in the Bank | Bank | | | | | | |
|---|---|---|---|---|---|---|---|
| | A | B | C | D | E | F | 0 |
| 11 | 75 | 91 | 107 | 11 | 27 | 43 | 59 |
| 12 | 60 | 76 | 92 | 108 | 12 | 28 | 44 |
| 13 | 45 | 61 | 77 | 93 | 109 | 13 | 29 |
| 14 | 30 | 46 | 62 | 78 | 94 | 110 | 14 |
| 15 | 79 | 95 | 111 | 15 | 31 | 47 | 63 |

Configuration Produced by the Second Embodiment

Figure 5B:
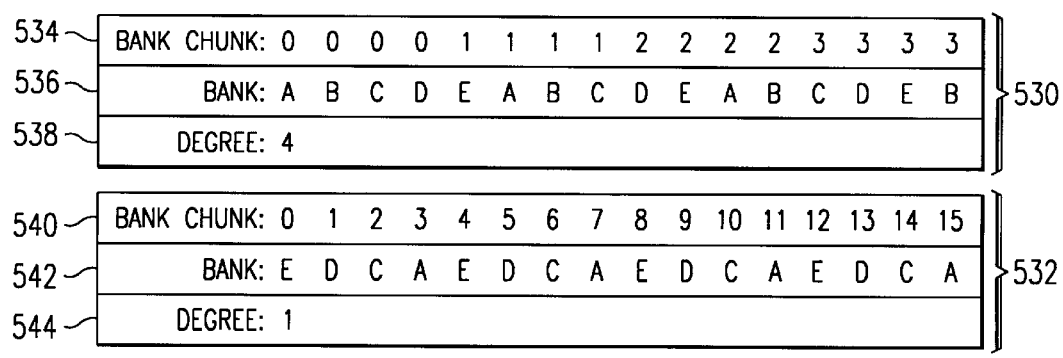
FIG. 5B is a block diagram that illustrates a configuration resulting from the operation of a second embodiment of the interleaver configuration tool.

FIG. 5B is a block diagram that illustrates the configuration produced by the second embodiment of the interleaver configuration tool 220 that creates a configuration for the interleaver 117 (as shown in FIG. 1). In the example of the present embodiment five banks 302, "A," "B," "C," "D," and "E" are available for allocation to chunks 404 (as shown in FIG. 1) of the memory 106 (as shown in FIG. 2). There are sixteen elements in the bank list 444 (as shown in FIG. 1), and there are two entry models 441 each with distinct range specifications 442 (as are shown in FIG. 2). The entry models 441 as shown in elements 530 and 532 are configured together.

The size of the range of specification 442 for each entry model 441 is proportional to the specified degree of interleave 450 (as shown in FIG. 2). Therefore, in the example shown in FIG. 5B the element 530 represents a configuration allocating eighty percent of the address space 300 (as shown in FIG. 2) and element 532 represents a configuration allocating twenty percent of the address space 300. That is, the range specified by the first range specification 442 as shown in element 530 is four times larger than the range specified by the second range specification 442 as shown in element 532. As shown in element 530, the first entry model 441 configures eighty percent of the range specified by the range specification 442. Further, the number of banks 302 over which the memory 106 will be interleaved by the interleaver 117 is five and the specified degree 450 (as shown in FIG. 2) is four. As shown in element 532, in the second entry model 441 the number of banks 302 over which the memory 106 is interleaved by the interleaver 117 is four and the specified degree 450 is one. Further, twenty percent of the range specified by the range specification 442 of one is configured in the entry model 441 shown in element 532.

The approximation derived by this second embodiment is better than approximations used in prior art. For example, in a prior art solution the number of banks 302 over which the memory 106 would be interleaved is four since four is the next lowest power of two relative to the five available banks 302. In this alternate embodiment the number of interleaved banks, five for eighty percent of the range specification 442 and four for the other twenty percent of the range specified by the range specification 442, is advantageous since a larger number of banks 302 are accessed more often than by prior art. Thereby the throughput of memory access in the computer system 100 (as shown in FIG. 1) is improved. Additionally this second embodiment requires only two entry models 441 for this type of interleaver 117 while the prior manner of configuring this type of interleaver 117 would require five entry models 441.

By configuring the entry models 441 shown by elements 530 and 532 together, each chunk of each bank 302 is only mapped once. More particularly and by way of example, as shown in FIG. 5B, the chunk 404 with the value "0" is allocated from the bank 302 with labels "A," "B," "C," and "D" as shown in element 530. Further, the chunk with the value "0" is allocated from the bank 302 labeled "E" as shown in element 532. Therefore, as shown in elements 530 and 532 the entry models 441 taken together properly allocate the chunk 404 with the value "0" to each bank 302 once.

Continuing as shown in FIG. 5B to illustrate the present embodiment, the chunks 404 with the values "1," "2," and "3" are managed in a similar fashion to the chunk 404 with the value of "0." Further, when the entry models 441 as shown in elements 530 and 532 are taken together, each chunk 404 from each bank 302 is allocated once.

The bank chunks 404 with the value of "4" are managed similarly to the previous chunks 404. However, it will be noted that the bank chunk 404 with the value of "4" is configured for allocation to the same banks 302 that were configured for allocation to the chunk 404 with the value of "0" in the entry model 441 shown in element 530. This repetition of allocation occurs since one cycle of the banks 302 is completed when sixteen input chunks 404 have been allocated. Therefore, the seventeenth input chunk 404 will be assigned the same bank 302 as the first input chunk 404.

Recall that the interleaver 117 re-uses the chunks 404 of the memory 106 for each entry 440 when the end of a bank list 444 is reached. Therefore, the allocation of the bank 302 with the label "B" to the sixteenth chunk 404 having the value of "3" as shown in element 530 ensures that the bank 302 with the label of "A" will not be allocated in succession twice.

Finally, the allocation of the banks 302 with the labels "C," "D," "E," and "B" to the chunks 404 having the value of "3" in element 530 pre-determines that the chunk 404 with the value of "3" in the entry model 441 shown in element 532 will be allocated to the bank 302 with the label of "A." Therefore the repetition sequence for the labels of the banks 302 used in the entry model 441 shown in element 532 is "E," "D," "C," and "A."

Table 5 illustrates a configuration created by the second embodiment of the interleaver configuration tool 220 for seven-way interleave. That is, the illustration of Table 5 includes seven banks 302, "A" through "G," and each bank 302 includes sixteen bytes of physical memory 106, and each range specification 442 (as shown in FIG. 1) is also sixteen bytes in size. Further, the chunk 404 size is one byte. Therefore, the size of the address space 300 (as shown in FIG. 2) is 112 bytes since 7*16=112. There are eight items in the bank list 444 (as shown in FIG. 1).

TABLE 5

Configuration Produced by the Second Embodiment

| Entry | Range Specification | Degree | Banks |
|---|---|---|---|
| 1 | 0–63 | 4 | A B C D E F G D |
| 2 | 64–95 | 2 | E F A B E F A B |
| 3 | 96–112 | 1 | G C G C G C G C |

Table 6 below illustrates the results of the configuration produced by the second embodiment as shown in Table 5. The elements in the table are physical addresses. By referring to Table 5 the physical address space 300 associated with each entry model 441 may be determined. For instance the second entry model 441 controls addresses 64 through 95. Therefore, as shown in Table 6 below, addresses 64–95 are allocated in the same order as shown in Table 5. That is address 64 is allocated to the bank 302 labeled "E," address 65 is allocated to bank 302 labeled "F," and so on. It will be appreciated that the poor interleave at the end of the address space is due to the very short bank list 444 which is used herein to limit the size of the example. Typically an interleaver implementation may have sixty-four or more bank list 444 items.

TABLE 6

Results of Configuration of Second Embodiment:

| Chunk Number in the Bank | Bank | | | | | | |
|---|---|---|---|---|---|---|---|
| | A | B | C | D | E | F | G |
| 0 | 0 | 1 | 2 | 3 | 64 | 65 | 96 |
| 1 | 66 | 67 | 97 | 7 | 4 | 5 | 6 |
| 2 | 8 | 9 | 10 | 11 | 68 | 69 | 98 |
| 3 | 70 | 71 | 99 | 15 | 12 | 13 | 14 |
| 4 | 16 | 17 | 18 | 19 | 72 | 73 | 100 |
| 5 | 74 | 75 | 101 | 23 | 20 | 21 | 22 |
| 6 | 24 | 25 | 26 | 27 | 76 | 77 | 102 |
| 7 | 78 | 79 | 103 | 31 | 28 | 29 | 30 |
| 8 | 32 | 33 | 34 | 35 | 80 | 81 | 104 |
| 9 | 82 | 83 | 105 | 39 | 36 | 37 | 38 |
| 10 | 40 | 41 | 42 | 43 | 84 | 85 | 106 |
| 11 | 86 | 87 | 107 | 47 | 44 | 45 | 46 |
| 12 | 48 | 49 | 50 | 51 | 88 | 89 | 108 |
| 13 | 90 | 91 | 109 | 55 | 52 | 53 | 54 |
| 14 | 56 | 57 | 58 | 59 | 92 | 93 | 110 |
| 15 | 94 | 95 | 111 | 63 | 60 | 61 | 62 |

The present embodiment novelly manages the configuration for the interleaving of banks 302 over two entry models 441, as shown in elements 530 and 532. Therefore, it will be noted that the value of any chunk 404 is mapped to a specific bank 302 label only once over the two entry models 441. Further, it will be appreciated that this second embodiment may operate on any number of entry models 441, with any number of banks 302, and with any apportionment of use between the allocation of chunks 404 to banks 302.

First Embodiment

Figure 6A:
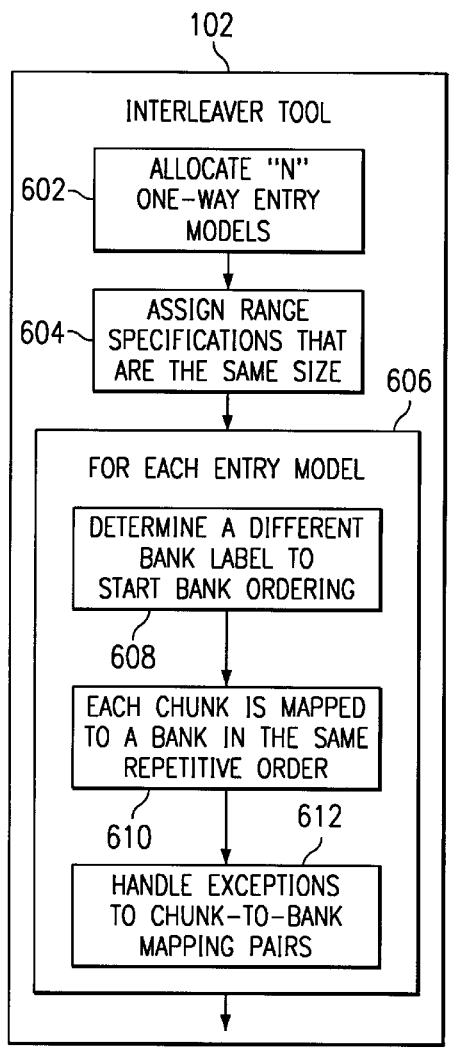
FIG. 6A is a flow diagram that represents the operation of the first embodiment of the interleaver configuration tool and is related to FIG. 5A.

FIG. 6A is a flow diagram that represents the operation of the first embodiment of the interleaver configuration tool 220 and is associated with the illustration of the configuration of the first embodiment as described in FIG. 5A. Initially as shown in element 602, the interleaver configuration tool 220 allocates "N" one-way entry models 441 (as shown in FIG. 2). Next the interleaver configuration tool 220 assigns equally sized range specifications 442 (as shown in FIG. 2) to the entry models 441 as shown in element 604.

The interleaver configuration tool 220 operates on each entry model 441, as shown in element 606. First as shown in element 608, a label for the bank 302 is determined to start the ordering of the banks 302, and the label is different from other entry models 441. Then, each chunk 404 is mapped to a bank 302 in the same repetitive order. As shown in element 612, any exceptions will be handled for the remaining chunk-to-bank mapping pairs such as the chunk with the value "15" as shown in FIG. 5A.

Second Embodiment

Figure 6B:
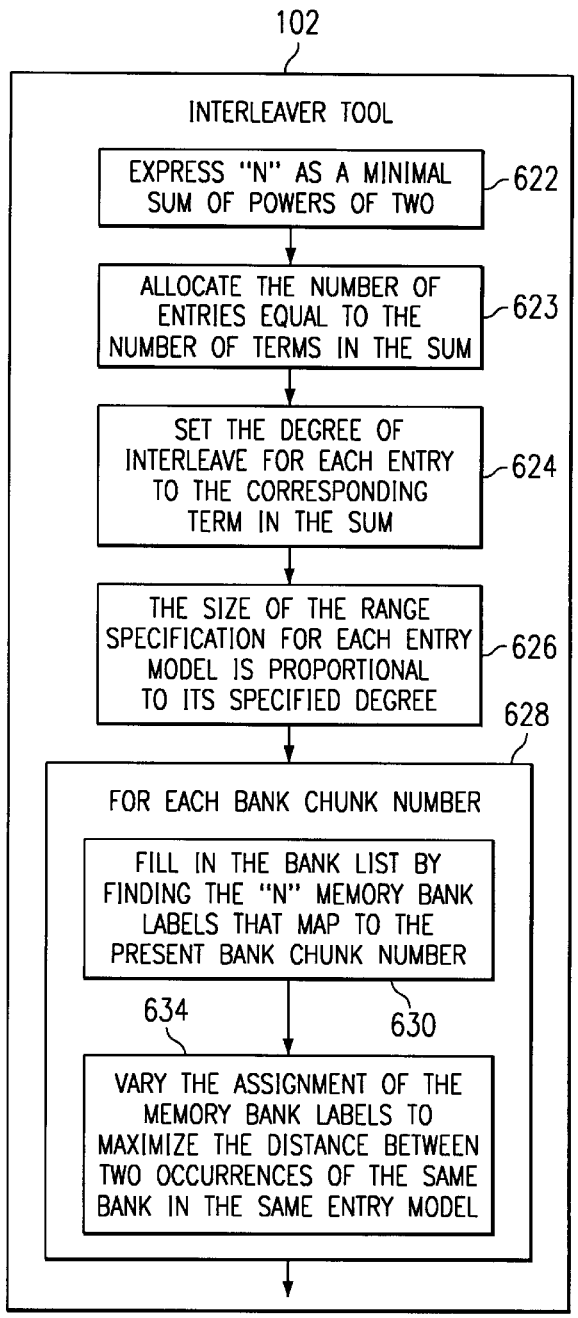
FIG. 6B is a flow diagram that represents the operation of a second embodiment of the interleaver configuration tool and is related to FIG. 5B.

FIG. 6B is a flow diagram that represents the operation of the second embodiment of the interleaver configuration tool 220 (as shown in FIG. 2) and is associated with the illustration of the configuration of the second embodiment as described in FIG. 5B. Initially, as shown in element 622, the interleaver configuration tool 220 expresses "N," the number of memory banks 302 (as shown in FIG. 1) over which to interleave, as a minimal sum of powers of two. Then, as shown in element 623 the interleaver configuration tool 220 allocates the number of entry models 441 (as shown in FIG. 2) which are equal to the number of terms in the sum. As shown in element 624 the interleaver configuration tool 220 sets the specified degree of interleave 450 (as shown in FIG. 2) for each entry model 441 to the corresponding term in the sum. Also, the interleaver configuration tool 220 determines the size of the range specification 442 (as shown in FIG. 2) for each entry model 441 such that the size is proportional to its specified degree of interleave 450, as shown in element 626.

Next the interleaver configuration tool 220 operates on each bank chunk 404 (as shown in FIG. 2) number in a memory bank 302 as shown in element 628. The interleaver configuration tool 220 fills in the bank lists 444 (as shown in FIG. 1) by finding the "N" labels of memory banks 302 that map to the present bank chunk 404 number as shown in element 630. Then, the interleaver configuration tool 220 varies the assignment of the value for the chunks 404 to the memory banks 302 to maximize the distance between two occurrences of the same memory bank 302 in the same entry model 441 as shown in element 634.

Alternative Embodiments

The foregoing description, for purposes of explanation, used specific nomenclature to provide a thorough understanding of the invention. However, it will be apparent to one skilled in the art that the specific details are not required in order to practice the invention. In other instances, well known devices are shown in block diagram form in order to avoid unnecessary distraction from the underlying invention. Thus, the foregoing descriptions of specific embodiments of the interleaver configuration tool are presented for purposes of illustration and description. They are not intended to be exhaustive or to limit the invention to the precise forms disclosed, obviously many modifications and variations are possible in view of the above teachings. Those skilled in the art will recognize that changes may be made in form and detail without departing from the scope of the invention. The invention is limited only by the claims.

What is claimed is:

1. A method for configuring an interleaver in a computer system; said computer system having at least one memory bank having at least one chunk; said computer system having at least one bank list referring to said memory bank; said method comprising:
    associating at least one entry model with at least one said memory bank;
    associating a specified degree of interleave with each said entry model, said specified degrees of interleave being of equal size;
    associating a range specification with each said entry model, said range specifications being of equal size;
    associating each said memory bank with a label, and identifying a repetitive order for said memory bank labels in said bank list;
    associating said chunk with a value, said chunk values being in order;
    wherein for each said entry model;
        determining said label for a first said memory bank in said bank list in said entry model, said first memory bank label being different from said first memory bank labels for said bank lists of other said entry models;
        determining said labels for said memory banks in said bank list in said entry model in said repetitive order, so that distance between occurrences of said memory bank labels in said bank list in said entry model is maximized;
        mapping said chunk values in said chunk value order, to said memory bank labels in said bank list for said entry model, said memory bank labels being in said repetitive order; and
    thereby efficiently configuring said interleaver with said entry models by maximizing use of said memory banks via maximization of said distance between occurrences of said memory bank labels in said bank list in said entry model.

2. The method as set forth in claim 1, wherein said determining said labels for said memory banks in said bank list in said entry model in said repetitive order step, further comprises handling exceptions so that distance between occurrences of said memory bank labels in said bank list in said entry model is maximized.

3. A method for configuring an interleaver in a computer system; said computer system having at least one memory bank having at least one chunk; said computer system having at least one bank list referring to said memory bank; said method comprising:
    associating at least one entry model with at least one said memory bank;
    associating a specified degree of interleave with each said entry model, said specified degrees of interleave being of equal size;
    associating a range specification with each said entry model, said range specifications being of equal size;
    identifying a repetitive order for said memory banks in said bank list;
    wherein for each said entry model;
        associating a first said memory bank in said bank list in said entry model, said first memory bank being different from said first memory bank for said bank lists of other said entry models;
        mapping said chunks in said entry model to said memory banks in said bank list for said entry model in said repetitive order so that distance between occurrences of said memory banks in said bank list in said entry model is maximized; and
    thereby efficiently configuring said interleaver with said entry models, by maximizing use of said memory banks via maximization of said distance between occurrences of said memory bank in said bank list in said entry model.

4. A method for configuring an interleaver in a computer system; said computer system having at least one memory bank having at least one chunk; said computer system having at least one bank list referring to said memory bank; said method comprising:
    determining a number of said memory banks for configuring said interleaver;
    determining a minimal sum of powers of two that is equal to said number of said memory banks,
    identifying terms of said minimal sum;
    determining a number of entry models by equating said number of said entry models to said terms of said minimal sum;
    corresponding each said term in said minimal sum to each said entry model;
    associating at least one said entry model with at least one said memory bank;

equating at least one specified degree of interleave for each said entry model to said corresponding term of said entry model;

specifying at least one range specification for each said entry model that is proportional to said specified degree of interleave for each said entry model;

associating said memory bank with a label;

associating said chunk with a value;

wherein for each said chunk value;
    mapping said chunk value to said memory bank labels thereby filling in said bank list;
    varying said mapping of said memory bank labels to maximize distance between occurrences of said memory bank labels; and thereby efficiently configuring said interleaver by filling in said bank list in each said entry model, by using minimal said entry models and by maximizing distance between occurrences of said memory bank labels.

5. A method for configuring an interleaver in a computer system; said computer system having at least one memory bank having at least one chunk, said computer system having at least one bank list referring to said memory bank; said method comprising:

determining a number of said memory banks for configuring said interleaver;

determining a minimal sum of powers of two that is equal to said number of said memory banks, identifying terms of said minimal sum;

determining a number of entry models by equating said number of said entry models to said terms of said minimal sum;

corresponding each said term in said minimal sum to each said entry model;

associating at least one said entry model with at least one said memory bank;

equating at least one specified degree of interleave for each said entry model to said corresponding term of said entry model;

specifying at least one range specification for each said entry model that is proportional to said specified degree of interleave for each said entry model;

wherein for each said chunk;
    mapping said chunk to said memory banks thereby filing in said bank list;
    varying said mapping of said memory banks to maximize distance between occurrences of said memory banks; and thereby efficiently configuring said interleaver by filling in said bank list in each said entry model, by using minimal said entry models and by maximizing distance between occurrences of said memory banks.

6. An interleaver configuration tool for configuring an interleaver in a computer system; said computer system having at least one memory bank having at least one chunk; said computer system having at least one bank list referring to said memory bank; said interleaver configuration tool comprising:

at least one entry model being associated with at least one said memory bank;

at least one specified degree of interleave being associated with each said entry model, said specified degrees of interleave being of equal size;

at least one range specification being associated with each said entry model, said range specifications being of equal size;

at least one label being associated with each said memory bank, said memory bank labels being in a repetitive order;

at least one value being associated with said chunk, said chunk value being in order;

wherein for each said entry model;
    a first said memory bank in said bank list in said entry model being associated with a first said label, said first memory bank label being different from said first memory bank labels for said bank lists of other said entry models;
    said labels for said memory banks in said bank list in said entry model being in said repetitive order so that distance between occurrences of said memory bank labels in said bank list in said entry model is maximized;
    said chunk values in said chunk value order being mapped to said memory bank labels in said memory bank list for said entry model, said memory bank labels being in said repetitive order; and thereby efficiently configuring said interleaver with said entry models by maximizing use of said memory banks via maximization of said distance between occurrences of said memory bank labels in said bank list in said entry model.

7. The interleaver configuration tool as set forth in claim 6, said interleaver configuration tool further comprising; wherein for handling exceptions, said labels for said memory banks in said bank list in said entry model being in said repetitive order, so that said memory bank labels are re-used to maximize distance between occurrences of said memory bank.

8. An interleaver configuration tool for configuring an interleaver in a computer system; said computer system having at least one memory bank having at least one chunk; said computer system having at least one bank list referring to said memory bank; said interleaver configuration tool comprising:

at least one entry model being associated with at least one said memory bank;

at least one specified degree of interleave being associated with each said entry model, said specified degrees of interleave being of equal size;

at least one range specification being associated with each said entry models, said range specifications being of equal size;

said memory banks in said bank list being in repetitive order;

wherein for each said entry model;
    a first said memory bank in said bank list being associated with said entry model, said first memory bank being different from said first memory bank for said bank lists of other said entry models;
    said chunks in said entry model being mapped to said memory banks in said bank list for said entry model in said repetitive order, so that distance between occurrences of said memory banks in said bank list in said entry model is maximized; and thereby efficiently configuring said interleaver with said entry models, by maximizing use of said memory banks via maximization of said distance between occurrences of said memory bank in said bank list in said entry model.

9. An interleaver configuration tool for configuring an interleaver in a computer system; said computer system having at least one memory bank having at least one chunk;

said computer system having at least one bank list referring to said memory bank; said interleaver configuration tool comprising:

at least one entry model being associated with at least one said memory bank;

a number of said memory banks for configuring said interleaver;

a minimal sum of powers of two that is equal to said number of said memory banks;

terms of said minimal sum, and each said term in said minimal sum corresponding to each said entry model;

at least one specified degree of interleave for each said entry model being equal to said corresponding term of said each entry model;

at least one range specification for each said entry model being proportional to said specified degree of interleave for each said entry model;

a label being associated with said memory bank;

a value being associated with said chunk;

wherein for each said chunk value; said chunk value being mapped to said memory bank labels by varying said memory bank labels to maximize distance between occurrences of said memory bank labels, thereby filling in said bank list; and thereby efficiently configuring said interleaver by filling in said bank list in each said entry model, by using minimal said entry models and by maximizing distance between occurrences of said memory bank labels.

10. An interleaver configuration tool for configuring an interleaver in a computer system; said computer system having at least one memory bank having at least one chunk; said computer system having at least one bank list referring to said memory bank; said interleaver configuration tool comprising:

at least one entry model being associated with at least one said memory bank;

a number of said memory banks for configuring said interleaver;

a minimal sum of powers of two that is equal to said number of said memory banks;

terms of said minimal sum, and each said term in said minimal sum corresponding to each said entry model;

at least one specified degree of interleave for each said entry model being equal to said corresponding term of each said entry model;

at least one range specification for each said entry model being proportional to said specified degree of interleave for each said entry model;

wherein for each said chunk; said chunk being mapped to said memory banks by varying said memory banks to maximize distance between occurrences of said memory banks, thereby filing in said bank list; and thereby efficiently configuring said interleaver by filling in said bank list in each said entry model, by using minimal said entry models and by maximizing distance between occurrences of said memory banks.

11. An article of manufacture comprising a program storage medium having computer readable program code for configuring an interleaver in a computer system; said computer system having at least one memory bank having at least one chunk; said computer system having at least one bank list referring to said memory bank; said article of manufacture comprising:

computer readable program code for associating at least one entry model with at least one said memory bank;

computer readable program code for associating a specified degree of interleave with each said entry model, said specified degrees of interleave being of equal size;

computer readable program code for associating a range specification with each said entry model, said range specifications being of equal size;

computer readable program code for associating each said memory bank with a label, and identifying a repetitive order for said memory bank labels in said bank list;

computer readable program code for associating said chunk with a value, said chunk values being in order;

wherein for each said entry model;

computer readable program code for determining said label for a first said memory bank in said bank list in said entry model, said first memory bank label being different from said first memory bank labels for said bank lists of other said entry models;

computer readable program code for determining said labels for said memory banks in said bank list in said entry model in said repetitive order so that distance between occurrences of said memory is maximized;

computer readable program code for mapping said chunk values in said chunk value order, to said memory bank labels in said bank list for said entry model, said memory bank labels being in said repetitive order; and thereby efficiently configuring said interleaver with said entry models by maximizing use of said memory banks via maximization of said distance between occurrences of said memory bank labels in said bank list in said entry model.

12. The article of manufacture as set forth in claim 11; wherein said computer readable program code for determining said labels for said memory banks in said bank list in said entry model in said repetitive order, further comprises computer readable program code for handling exceptions so that distance between occurrences of said memory bank labels in said bank list in said entry model is maximized.

13. An article of manufacture for configuring an interleaver in a computer system; said computer system having at least one memory bank having at least one chunk; said computer system having at least one bank list referring to said memory bank; said method comprising:

computer readable program code for associating at least one entry model with at least one said memory bank;

computer readable program code for associating a specified degree of interleave with each said entry model, said specified degrees of interleave being of equal size;

computer readable program code for associating a range specification with each said entry model, said range specifications being of equal size;

computer readable program code for identifying a repetitive order for said memory banks in said bank list;

wherein for each said entry model;

computer readable program code for associating a first said memory bank in said bank list in said entry model, said first memory bank being different from said first memory bank for said bank lists of other said entry models;

computer readable program code for mapping said chunks in said entry model to said memory banks in said bank list for said entry model in said repetitive order so that distance between occurrences of said memory banks in said bank list in said entry model is maximized; and thereby efficiently configuring said interleaver with said entry models, by maximizing use of said memory banks via maximization of said distance between occurrences of said memory bank in said bank list in said entry model.

14. An article of manufacture for configuring an interleaver in a computer system; said computer system having at least one memory bank having at least one chunk; said computer system having at least one bank list referring to said memory bank; said method comprising:
 computer readable program code for determining a number of said memory banks for configuring said interleaver;
 computer readable program code for determining a minimal sum of powers of two that is equal to said number of said memory banks;
 computer readable program code for identifying terms of said minimal sum;
 computer readable program code for determining a number of entry models by equating said number of said entry models to said terms of said minimal sum;
 computer readable program code for corresponding each said term in said minimal sum to each said entry model;
 computer readable program code for associating at least one said entry model with at least one said memory bank;
 computer readable program code for equating at least one specified degree of interleave for each said entry model to said corresponding term of each said entry model;
 computer readable program code for specifying at least one range specification for each said entry model that is proportional to said specified degree of interleave for each said entry model;
 computer readable program code for associating said memory bank with a label;
 computer readable program code for associating said chunk with a value;
 wherein for each said chunk value;
  computer readable program code for mapping said chunk value to said memory bank labels thereby filling in said bank list;
  computer readable program code for varying said mapping of said memory bank labels to maximize distance between occurrences of said memory bank labels; and
 thereby efficiently configuring said interleaver by filling in said bank list in each said entry model, by using minimal said entry models and by maximizing distance between occurrences of said memory bank labels.

15. An article of manufacture for configuring an interleaver in a computer system; said computer system having at least one memory bank having at least one chunk; said computer system having computer readable program code for at least one bank list referring to said memory bank; said method comprising:
 computer readable program code for determining a number of said memory banks for configuring said interleaver;
 computer readable program code for determining a minimal sum of powers of two that is equal to said number of said memory banks;
 computer readable program code for identifying terms of said minimal sum;
 computer readable program code for determining a number of entry models by equating said number of said entry models to said terms of said minimal sum;
 computer readable program code for corresponding each said term in said minimal sum to each said entry model;
 computer readable program code for associating at least one said entry model with at least one said memory bank;
 computer readable program code for equating at least one specified degree of interleave for each said entry model to said corresponding term of each said entry model;
 computer readable program code for specifying at least one range specification for each said entry model that is proportional to said specified degree of interleave for each said entry model;
 wherein for each said chunk;
  computer readable program code for mapping said chunk to said memory banks thereby filing in said bank list;
  computer readable program code for varying said mapping of said memory banks to maximize distance between occurrences of said memory banks; and
 thereby efficiently configuring said interleaver by filling in said bank list, by using minimal said entry models and by maximizing distance between occurrences of said memory banks.

16. A computer readable memory device encoded with a data structure having entries, for configuring an interleaver in a computer system; said computer system having at least one memory bank having at least one chunk; said computer system having at least one bank list referring to said memory bank; said memory device comprising:
 at least one entry model entry being associated with at least one said memory bank;
 at least one specified degree of interleave entry being associated with each said entry model entry, said specified degrees of interleave entries being of equal size;
 at least one range specification entry being associated with each said entry model entry, said range specification entries being of equal size;
 said memory banks in said bank list entry being in repetitive order;
 wherein for each said entry model entry;
  a first said memory bank in said bank list entry being associated with said entry model entry, said first memory bank being different from said first memory bank for said bank list entries of other said entry model entries;
  said chunks in said entry model entry being mapped to said memory banks in said bank list entry for said entry model entry in said repetitive order, so that distances between occurrences of said memory banks in said bank list entry in said entry model entry is maximized; and
 thereby efficiently configuring said interleaver with said entry model entries, by maximizing use of said memory banks via maximization of said distance between occurrences of said memory bank in said bank list entry in said entry model.

17. A computer readable memory device encoded with a data structure having entries for configuring an interleaver in a computer system; said computer system having at least one memory bank having at least one chunk; said computer system having at least one bank list entry referring to said memory bank; said memory device comprising:
 at least one entry model entry being associated with said memory bank;
 a number entry of said memory banks for configuring said interleaver;

a minimal sum of powers of two entry that is equal to said number entry of said memory banks;

term entries of said minimal sum entry, and each said term entry in said minimal sum entry corresponding to each said entry model entry;

at least one specified degree of interleave entry for each said entry model entry being equal to said corresponding term entry of each said entry model entry;

at least one range specification entry for each said entry model entry being proportional to said specified degree of interleave entry for each said entry model entry;

wherein for each said chunk; said chunk being mapped to said memory banks by varying said memory banks to maximize distance between occurrences of said memory banks, thereby filing in said bank list entry; and thereby efficiently configuring said interleaver by filling in said bank list in each said entry model entry, by using minimal said entry model entries and by maximizing distance between occurrences of said memory banks.

* * * * *